Dec. 31, 1929.    H. T. FAUS    1,742,138
TEMPERATURE RESPONSIVE DEVICE
Filed Nov. 28, 1924
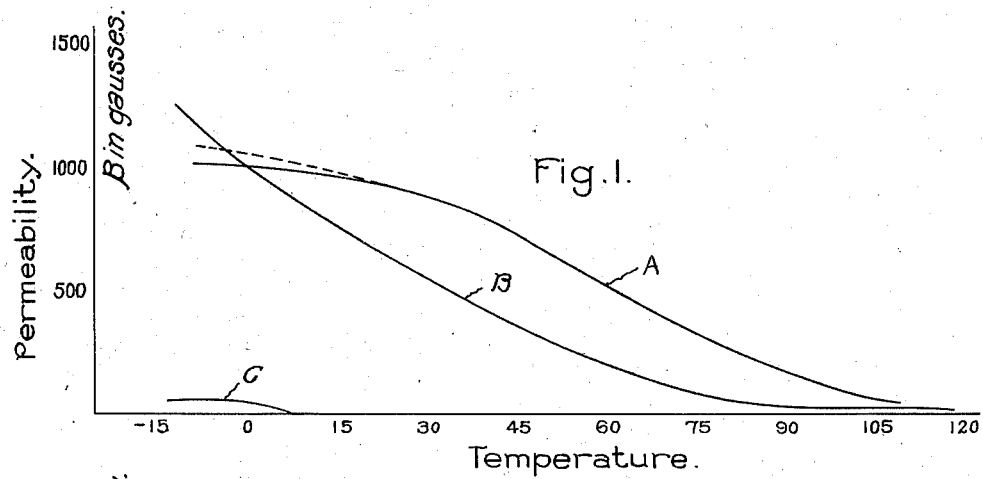
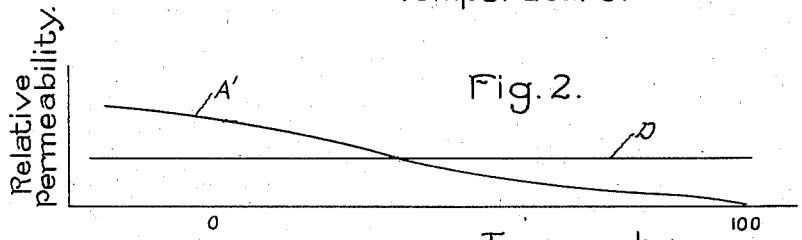
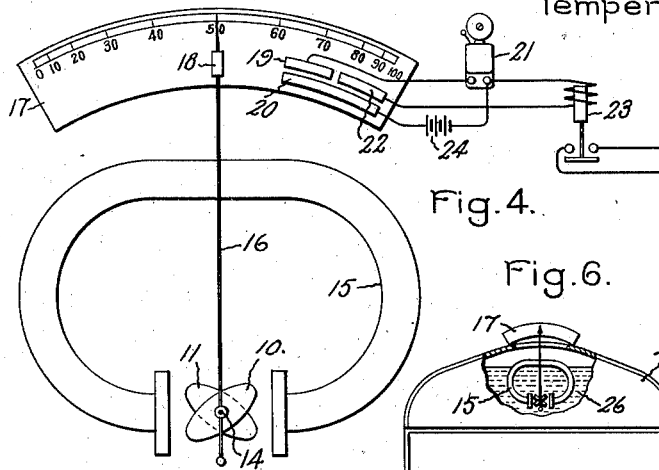
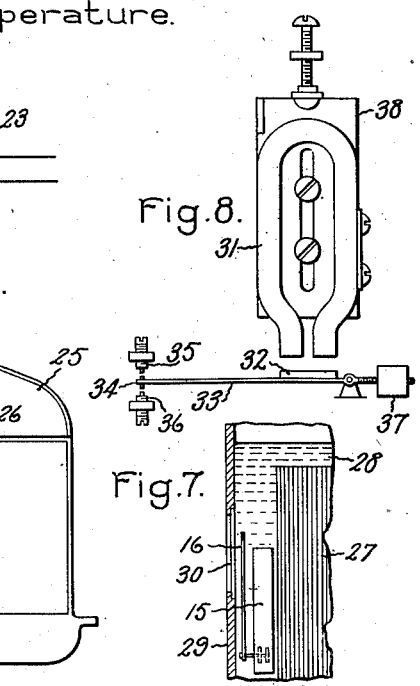
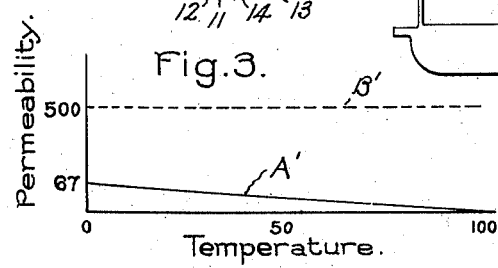
Inventor:
Harold T. Faus,
by *Alexander F. [Smit]*
His Attorney.

Patented Dec. 31, 1929

1,742,138

UNITED STATES PATENT OFFICE

HAROLD T. FAUS, OF LYNN, MASSACHUSETTS, ASSIGNOR TO GENERAL ELECTRIC COMPANY, A CORPORATION OF NEW YORK

TEMPERATURE-RESPONSIVE DEVICE

Application filed November 28, 1924. Serial No. 752,744.

My invention relates to temperature responsive devices and in particular to a temperature responsive device which utilizes the effect of magnetism upon a magnetic body the permeability of which varies with temperature.

The permeability of certain magnetic materials is substantially constant at all ordinary temperatures while the permeability of other magnetic materials varies appreciably with changes in temperature, for example the permeability of iron, such as is used in the magnetic circuits of electrical apparatus, is substantially constant with ordinary changes in temperature, and the permeability of certain alloys of nickel decreases appreciably with increase in temperature. This variable relationship between permeability and temperature is nearly linear and is reversible in its effect; that is, although the permeability of the material decreases with an increase in temperature, the permeability returns to its initial value when the material is cooled to its former temperature. The reason for this phenomenon is not well understood, but experiments have proven the law of the phenomenon to a sufficient degree of accuracy that it may be utilized according to my invention to provide temperature responsive devices which are simple and rugged in construction and accurate and constant in their performance.

In carrying my invention into effect, I prefer to employ a movable member, part or all of which is composed of a magnetic material, the permeability of which varies with temperature changes, and subject this material to the influence of a magnetic field, preferably the field of a permanent magnet, in such a way as to obtain a movement proportional to the temperature change. By using a movable member made up of two magnetic materials having constant and variable temperature coefficients of permeability respectively and arranged so that the magnetic field acts differentially upon the two parts of the movable member, the device may be made independent of variations in the strength of the magnetic field.

The features of my invention which are believed to be novel and patentable will be pointed out in the claims appended hereto. For a better understanding of my invention, reference is made in the following description to the accompanying drawing in which Figs. 1, 2, and 3 are permeability temperature curves explanatory of my invention; Fig. 4 illustrates a plan view of a temperature responsive indicator and controller built in accordance with my invention; Fig. 5 is a partial view taken at right angles to Fig. 4 illustrating details of the movable armature member; Fig. 8 illustrates a modification of the invention arranged as a temperature responsive relay device; and Figs. 6 and 7 illustrate my invention as used for automobile and transformer temperature indicators respectively.

Referring to Fig. 1, the ordinate scale represents permeability and the abscissæ scale represents temperature in degrees centigrade. The full line curve A represents the manner in which the permeability of an alloy containing approximately 75% nickel and 25% copper varies with temperature changes. Curve B represents a similar curve for an alloy containing approximately 70% nickel and 30% copper. It will be noted that between the temperature limits of about zero and 100° C., the permeability falls off with increase in temperature, thus making these alloys suitable for use in my invention. Curve C represents a similar curve for an alloy containing approximately 60% nickel and 40% copper in which the permeability becomes zero at a relatively low temperature. The nickel used in each instance given above contains a small percentage of iron, approximately 2.3%, as an impurity. By combining two members made up of the alloys represented by curves A and C, we may obtain a resultant temperature permeability curve which conforms to curve A as modified at its upper end in dotted lines. The modified curve is somewhat better for the purposes of my invention than the full line curve A.

Referring now to Fig. 2, the ordinate scale represents relative permeability and the abscissæ represent temperature in degrees centigrade. Curve A' represents the relative permeability temperature curve of a member such as a composite bar made up of two alloys corresponding to the modified curve A of Fig. 1. Curve D represents the relative permeability temperature curve of ordinary transformer iron in which the permeability is substantially constant over the temperature range represented and lies about midway between the upper and lower limits of curve A'. It should be explained that for equal areas and field strength the permeability of transformer iron is considerably higher than the alloys in question at zero degrees centigrade, the correct relationship for equal unit areas being represented in the curves of Fig. 3 where curve B' represents the permeability of transformer iron and curve A' that for the composite alloy bar in question. However, by reducing the area of a bar of transformer iron with respect to the area of the composite alloy bar, we may obtain the relative permeability relation depicted in Fig. 2.

Referring now to Figs. 4 and 5, I make up a movable element comprising a member 10 made of ordinary transformer iron and a composite member 11, made up of a part 12 of an alloy containing approximately 75% nickel and 25% copper, and a part 13 of an alloy containing approximately 60% nickel and 40% copper, the nickel in each instance containing a small percentage of iron as an impurity. These two members are secured at their centers to a shaft 14 and are arranged with their long axes at an acute angle to each other. This angle is preferably between 60 and 90 degrees. The shaft 14 is pivoted in jewel bearings and the armature member thus formed placed in the air gap of a magnet 15, preferably, although not necessarily, a permanent magnet. To the shaft 14 is secured a needle 16 which cooperates with a scale 17 graduated in temperature. The thickness of the iron member 10 is reduced as compared to that of the alloy member 11 to obtain the relative permeability relation represented in Fig. 2.

It will now appear that at temperatures below about 50 degrees C., the composite member 11 will have a greater relative permeability than member 10 and will turn the movable element so as to enclose a greater number of lines of flux of the permanent magnet while at higher temperatures, member 10 will have the greatest relative permeability and turn the armature so that it will enclose the greater number of flux lines. That is, the combined armature will always take the position of least reluctance, the flux dividing through the two members 10 and 11 in proportion to their relative permeability values. The members are preferably given the oblong shape in order that the deflection will be more nearly uniform. By making the member 13 somewhat thicker than the member 12, the dotted line modification of curve A in Fig. 1 can be made more pronounced than is represented.

After the parts are assembled and properly adjusted, the instrument is carefully calibrated with some other accurate temperature measuring device and the scale indications marked. In calibrating, care should be taken to maintain a given temperature a sufficient length of time to allow the armature parts to reach this temperature. By making the parts 10 and 11 fairly thin and separated, as shown, the response of the device to changes in temperature will be sufficiently prompt for all ordinary purposes. In some cases, it is desirable that rapid fluctuations in temperature be disregarded and only the average temperature indicated. In such cases, the armature parts may be made thicker, so as to respond more slowly to temperature changes. It will be evident that the accuracy of indication is independent of the strength of the permanent magnet 15 so long as the magnet is sufficiently strong to turn the armature to the position of least reluctance. It will be seen that this provides a simple, rugged temperature responsive device which will maintain its accuracy and usefulness indefinitely. The scale may be made as large as desirable without changing any part of the device except the length of the pointer. As represented in Fig. 4, the pointer may carry a contactor 18 arranged to bridge stationary contacts 19 and 20 to close the circuit of an alarm 21 at some predetermined temperature and if the temperature continues to increase, the contactor 18 may bridge stationary contacts 20 and 22 to close the circuit of a relay 23 at some other predetermined temperature, the circuits being supplied by a suitable source indicated at 24.

The instrument may be immersed in a liquid to indicate the temperature thereof. For example, in Fig. 6, I have represented an automobile radiator at 25 with my improved temperature indicator immersed in the cooling liquid 26. This application has certain advantages over prior devices for this purpose in that the temperature indication is more clearly visible from the driver's seat than devices which operate upon the expansion of a liquid, and further, the device also acts to indicate when the cooling liquid becomes so low as to become dangerous for the further operation of the automobile. This last mentioned function is possible by simply positioning the armature member of the instrument at a depth in the cooling medium where if the armature is immersed, no dangerous low water condition exists, but if not immersed, a dangerous low water condition does exist and this indicating phenomenon is produced by the steadying action of the liquid on the movable armature when immersed. Thus, if the armature is fully immersed, the indication will be fairly steady even when the automobile is traveling at a rapid rate, the liquid acting as a damper against oscillations, but if not immersed, the slightest sidewise jar will cause the indicator to oscillate. I consider this to be an important aspect and application of the invention.

In Fig. 7 I have represented the device as used for indicating the temperature of a transformer. In this figure, 26 represents the transformer laminations, 28 the transformer insulating and cooling oil, and 29 the exterior transformer casing. The casing wall contains a glass window 30 upon which may be marked a suitable temperature scale. The temperature responsive instrument is simply positioned in the transformer oil adjacent to the window where the pointer cooperates with the scale on the window. The question may arise why the presence of a magnetic field in close proximity to the instrument, as in this application, will not produce errors. The answer is that the permanent magnet 15 may be made sufficiently strong to avoid any disturbance from the leakage flux which might be expected from the transformer core.

In Fig. 8 I have represented a temperature responsive relay made up of a permanent magnet 31 and an armature 32 made of a magnetic member having a negative temperature coefficient of permeability, such, for example, as represented in curve B, Fig. 1. The armature is carried on a pivoted arm 33, the outer end of which is provided with a contact 34 arranged to cooperate with stationary contacts 35 and 36. A weight 37 is provided for adjusting purposes and the permanent magnet may be adjusted toward and away from the armature by reason of its adjustable support 38. The parts are adjusted so that at temperatures below a certain predetermined temperature, the armature 32 will be attracted by the permanent magnet to raise the armature and close the upper set of contacts. Now, as the temperature increases, the pull of the permanent magnet on the armature will constantly decrease, due to the decrease in the permeability of the armature until the armature will drop and close the lower set of contacts. Before the armature will again be raised, the temperature must decrease slightly to a point where the permeability of the armature has been restored to a sufficient degree to again create an appreciable magnetic pull. For example, the armature may be raised at 85° C. and lowered at 90° C., or by a different adjustment the armature may be raised at 60° C. and lowered at 90° C.

The invention is not limited to the use of the particular alloys mentioned; for example, certain nickel steel alloys have a negative temperature coefficient of permeability which gives a substantially straight line of temperature permeability curve over a sufficient range to make it useful in this invention.

According to the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent in the United States is:—

1. A temperature responsive device comprising means forming a magnetic circuit and having magnetic sections of different temperature coefficients of permeability connected in parallel in said magnetic circuit, said circuit including a movable armature member which is free to assume a position of least reluctance in said circuit, the magnetic sections having different temperature coefficients of permeability and being relatively positioned to cause said armature to assume different positions at different temperatures.

2. An electromagnetic temperature responsive device comprising stationary means for producing a magnetic field and a movable armature within the influence of said field, said armature comprising two magnetic sections one of which has a substantially constant temperature coefficient of permeability and the other of which has a variable temperature coefficient of permeability, said sections being arranged so that the flux of said field will pass through said sections in parallel in proportion to their relative permeabilities, and so that the armature member will assume different positions of least reluctance for different temperatures.

3. An electromagnetic temperature responsive device comprising stationary means for producing a magnetic field and an armature within the influence of said field comprising a pair of magnetic bar members having different temperature coefficients of permeability, said members being rotatably mounted within said field with their longitudinal axes at an acute angle to each other such that the position of least reluctance of said armature will vary with temperature changes.

4. An electromagnetic temperature responsive device comprising a permanent magnet provided with an air gap between its poles and an armature member rotatably mounted in said air gap comprising a shaft, a pair of oblong magnetic members having different temperature coefficients of permeability, said members being secured to said shaft at their centers with their longitudinal axes at an acute angle to each other such that the armature member will take different rotative positions of least reluctance at different temperatures.

5. An electromagnetic temperature responsive device comprising a magnet provided with an air gap between its poles and an armature member rotatably mounted in said air gap comprising a shaft upon which is mounted a pair of magnetic bar members having different temperature coefficients of permeability and having dimensions such that their relative permeabilities are equal at a given temperature, said members being secured to said shaft at their centers with their longitudinal axes at an acute angle to each other.

6. A temperature responsive device comprising a magnet provided with an air gap between its poles, an armature member rotatably mounted in said air gap comprising a shaft, a pair of magnetic bar members secured to said shaft at an acute angle, one of said members having a substantially constant temperature coefficient of permeability and the other member having a substantially linear negative temperature coefficient of permeability from about zero to 100 degrees centigrade, a pointer secured to said shaft, and a temperature scale with which said pointer cooperates to indicate the temperature over the range mentioned.

7. A temperature indicator for indicating the temperature of the cooling medium of a motor vehicle comprising a permanent magnet provided with an air gap, an armature member pivotally mounted in said air gap having cross bars of magnetic material of different temperature coefficients of permeability so arranged as to take different positions of least reluctance at different temperatures, an indicator secured to and movable with said armature, and a temperature scale cooperating therewith, said armature member being immersed in the cooling liquid of said motor vehicle when the liquid is at a normal level.

8. A temperature and low water indicator for the cooling medium of motor vehicles, comprising a liquid cooling radiator, a temperature responsive device in said radiator consisting of a permanent magnet provided with an air gap, an armature member pivotally mounted in said air gap having cross bars of magnetic material of different temperature coefficients of permeability arranged to cause the armature to assume different rotative positions of least reluctance at different temperatures, an indicator secured to and moved by said armature, and a temperature scale with which said indicator cooperates located above said radiator, the armature member being positioned in said radiator such that when the radiator contains ample cooling medium the armature is immersed therein and when the radiator contains insufficient cooling medium the armature is above the level thereof, the cooling medium serving to damp the oscillations of said armature when it is immersed in said medium.

9. A temperature measuring instrument comprising a field magnet provided with an air gap, an armature member in the air gap having an elongated magnetic element pivotally mounted at its center so as to rotate and assume different rotative positions of different magnetic reluctance in the field of the magnet across the air gap, and means for yieldingly biasing said magnetic element away from a rotative position of minimum reluctance in the air gap, said elongated magnetic element having a negative temperature coefficient of permeability over a considerable range of temperature whereby it assumes a rotative position proportional to temperature.

In witness whereof, I have hereunto set my hand this 25th day of November, 1924.

HAROLD T. FAUS.